(12) United States Patent
Grefenstette et al.

(10) Patent No.: US 11,593,640 B2
(45) Date of Patent: *Feb. 28, 2023

(54) AUGMENTED RECURRENT NEURAL NETWORK WITH EXTERNAL MEMORY

(71) Applicant: DeepMind Technologies Limited, London (GB)

(72) Inventors: Edward Thomas Grefenstette, London (GB); Karl Moritz Hermann, London (GB); Mustafa Suleyman, London (GB); Philip Blunsom, Oxford (GB)

(73) Assignee: DeepMind Technologies Limited, London (GB)

( * ) Notice: Subject to any disclaimer, the term of this patent is extended or adjusted under 35 U.S.C. 154(b) by 784 days.

This patent is subject to a terminal disclaimer.

(21) Appl. No.: 16/565,245

(22) Filed: Sep. 9, 2019

(65) Prior Publication Data

US 2020/0005147 A1 Jan. 2, 2020

Related U.S. Application Data

(63) Continuation of application No. 15/172,068, filed on Jun. 2, 2016, now Pat. No. 10,410,119.

(Continued)

(51) Int. Cl.
*G06N 3/08* (2006.01)
*G06N 3/04* (2023.01)
(Continued)

(52) U.S. Cl.
CPC .............. *G06N 3/08* (2013.01); *G06N 3/0445* (2013.01); *G06N 3/063* (2013.01); *G06N 3/082* (2013.01)

(58) Field of Classification Search
CPC .......... G06N 3/08; G06N 3/063; G06N 3/082; G06N 3/04; G06N 3/0445
See application file for complete search history.

(56) References Cited

U.S. PATENT DOCUMENTS

| | | |
|---|---|---|
| 8,712,942 B2 | 4/2014 | Fiske |
| 2016/0117586 A1* | 4/2016 | Graves ..................... G06N 3/08 706/25 |
| 2016/0163310 A1 | 6/2016 | Lee et al. |

OTHER PUBLICATIONS

Gers et al. "LSTM Recurrent Networks Learn Simple Context-Free and Context-Sensitive Languages", IEEE Trans. NN, 2001, pp. 1333-1340.*

(Continued)

*Primary Examiner* — Li Wu Chang
(74) *Attorney, Agent, or Firm* — Fish & Richardson P.C.

(57) ABSTRACT

Methods, systems, and apparatus, including computer programs encoded on computer storage media, for augmenting neural networks with an external memory. One of the methods includes providing an output derived from the neural network output for the time step as a system output for the time step; maintaining a current state of the external memory; determining, from the neural network output for the time step, memory state parameters for the time step; updating the current state of the external memory using the memory state parameters for the time step; reading data from the external memory in accordance with the updated state of the external memory; and combining the data read from the external memory with a system input for the next time step to generate the neural network input for the next time step.

23 Claims, 5 Drawing Sheets

Related U.S. Application Data

(60) Provisional application No. 62/172,023, filed on Jun. 5, 2015.

(51) Int. Cl.
*G06N 3/063* (2023.01)
*G06N 3/082* (2023.01)

(56) References Cited

OTHER PUBLICATIONS

EP Office Action in European Appln. No. 16172981.9, dated Jun. 23, 2021, 13 pages.
Allauzen et al., "OpenFst: A General and Efficient Weighted Finite-state Transducer Library," CIAA 2007, LNCS 4783, pp. 11-23, 2007, © Springer-Verlag Berlin Heidelberg 2007.
Das et al., "Learning Context-free Grammars: Capabilities and Limitations of a Recurrent Neural Network with an External Stack Memory," In the Proceedings of the 14th Annual Conference of the Cognitive Science Society, 1992, Indiana University, 6 pages.
Das et al., "Using Prior Knowledge in an NNPDA to Learn Context-free Languages," Advances in Neural Information Processing Systems 5, 1993, pp. 65 72.
Dreyer et al., "Latent-variable Modeling of String Transductions with Finite-state Methods," (Oct. 2008) [online] (retrieved from http://www.aclweb.org/anthology/D08-1113), 10 pages.
Dyer et al., "Transition-based Dependency Parsing with Stack Long Short-term Memory," In Proceedings of the 53rd Annual Meeting of the Association for Computational Linguistics and the 7th International Joint Conference on Natural Language Processing, pp. 334-343, Beijing China, 2015, © 2015 Association for Computational Linguistics.
EP Office Action in European Appln No. 16172981.9, dated Jul. 5, 2019, 11 pages.
Extended European Search Report issued in European Application No. 16172981.9, dated Mar. 7, 2017, 13 pages.
Graves et al., "Neural Turing Machines," (Dec. 10, 2014) [online] (retrieved from https://arxiv.org/pdf/1410.5401v2.pdf), 26 pages.
Graves, "Generating Sequences with Recurrent Neural Networks," (Jun. 5, 2014) [online] (retrieved from http://arxiv.org/pdf/1308.0850v5.pdf), 43 pages.
Graves, "Sequence Transduction with Recurrent Neural Networks," In Representation Learning Workshop ICLM 2012 [online] (retrieved from http://www.cs.toronto.edu/~graves/seq_trans_slides.pdf), 15 pages.
Grefenstette et al. "Learning to Transduce with Unbounded Memory," arXiv preprint arXiv 1506.02516, Nov. 3, 2015, 14 pages.
Joulin and Mikolov, "Inferring Algorithmic Patterns with Stack-augmented Recurrent Nets," (Jun. 1, 2015) [online] (retrieved from https://arxiv.org/pdf/1503.01007.pdf), 10 pages.
Sukhbaatar et al., "Weakly Supervised Memory Networks," (Mar. 31, 2015) [online] (retrieved from http://arxiv.org/pdf/1503.08895v1.pdf), 9 pages.
Sun et al., "The Neural Network Pushdown Automation: Model, Stack and Learning Simulations," (1995) [online] (retrieved from https://clgiles.ist.psu.edu/papers/UMD-CS-TR-3118.recurrent.net.pushdown.automata.pdf), 36 pages.
Wu, "Stochastic Inversion Transduction Grammars and Bilingual Parsing of Parallel Corpora," Computational Linguistics, 1997, 23(3):377-403.
Zaremba and Sutskever, "Reinforcement Learning Neural Turing Machines," (May 4, 2015) [online] (retrieved from http://arxiv.org/pdf/1505.00521v1.pdf), 13 pages.

* cited by examiner

AUGMENTED RECURRENT NEURAL NETWORK WITH EXTERNAL MEMORY

CROSS-REFERENCE TO RELATED APPLICATIONS

This is continuation of U.S. application Ser. No. 15/172,068, filed on Jun. 2, 2016, which claims priority to U.S. Provisional Application No. 62/172,023, filed on Jun. 5, 2015. The disclosures of the prior applications are considered part of and are incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from processing a previous input in computing a current output.

An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to augmenting neural networks with an external memory.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Augmenting recurrent neural networks with an external memory as described in this specification allows the networks to implement continuously differentiable analogues of traditional data structures, e.g., Stacks, Queues, and Double-Ended Queues. Augmenting recurrent neural networks with an external memory as described in this specification provides a logically unbounded memory while permitting efficient constant time push and pop operations. Such augmented recurrent neural networks exhibit superior generalization performance on sequence transduction tasks as compared to non-augmented recurrent neural networks. Additionally, such augmented recurrent neural networks are able to learn to reproduce the generating transduction algorithms and generalize to inputs well beyond those encountered in training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
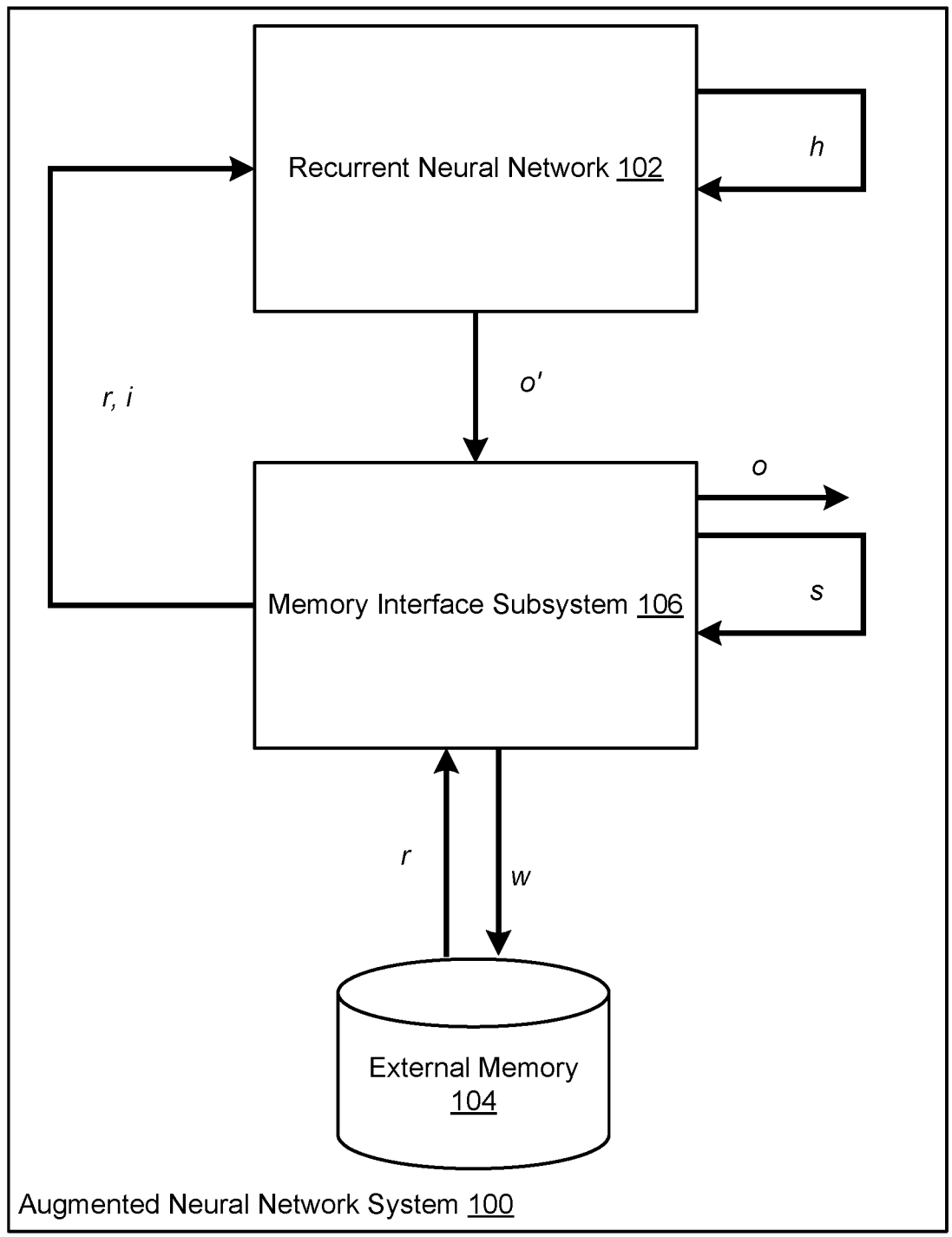
FIG. 1 shows an example augmented neural network system.

FIG. 1 shows an example augmented neural network system 100. The augmented neural network system 100 is an example of a system implemented as computer programs on one or more computers in one or more locations, in which the systems, components, and techniques described below are implemented.

The augmented neural network system 100 is configured to receive an input and to generate a sequence of system outputs from the input. For example, the system can receive an input sequence that includes a respective system input at each of multiple time steps and to generate a target sequence for the input sequence that includes a respective system output at each of the time steps.

The target sequence for the input sequence is an ordered sequence of outputs that the augmented neural network system 100 has classified as representing the input sequence. For example, if the input sequence is a sequence of words in an original language, e.g., a sentence or phrase, the target sequence generated by the sequence representation system may be a translation of the input sequence into a target language, i.e., a sequence of words in the target language that represents the sequence of words in the original language. As another example, if the input sequence is a sequence of graphemes, e.g., the sequence {g, o, o, g, l, e}, the target sequence generated by the sequence representation system 100 may be a phoneme representation of the input sequence, e.g., the sequence {g, uh, g, ax, l}. As another example, if the input sequence is a sequence of words, the target sequence generated by the sequence representation system 100 may be a representation of a parse tree of the input sequence. As another example, if the input sequence is a sequence of words that make up a statement, the target sequence generated by the sequence representation system 100 may be a reformulation of the statement as a question. As another example, for a given input sequence that includes multiple inputs, the target sequence generated by the sequence representation system 100 may be the inputs in the input sequence sorted according to predetermined criteria.

For example, the augmented neural network system 100 can receive a system input i as part of an input sequence and generate a system output o from the system input i. The augmented neural network system 100 can store the generated sequence of outputs in an output data repository or provide the output for use for some other immediate purpose.

In particular, the augmented neural network system 100 includes a recurrent neural network 102, an external memory 104, and a memory access subsystem 106.

The recurrent neural network 102 is configured to receive a neural network input at each of the time steps and, for each time step, to process the neural network input and a current internal state h of the recurrent neural network to generate a neural network output o' for the time step and to update the current internal state h of the recurrent neural network. For example, the recurrent neural network 102 may be a long short-term memory (LSTM) neural network. LSTM neural networks are described in more detail in "Generating sequences with recurrent neural networks," Alex Graves, available at http://arxiv.org/abs/1308.0850v5.

Generally, each neural network input received by the recurrent neural network 102 is a combination, e.g., a concatenation, of the current system input i, i.e., the system input at the current time step, and data r read from the external memory by the memory interface subsystem 106 during processing of the preceding neural network output generated by the recurrent neural network 102.

For example, the recurrent neural network 102 may be configured to receive the current system input i and data r read from the external memory 104 and to generate the neural network output o' that is provided to the memory interface subsystem 106.

The memory interface subsystem 106 receives outputs generated by the recurrent neural network 102 and translates the received outputs to update the current state of the external memory 104 and to read from the external memory 104 in accordance with the updated current state.

That is, the memory interface subsystem 106 receives the current output o' generated by the recurrent neural network 102 and determines the current system output o, updates the current state of the external memory 104, including writing data w to the external memory 104.

The memory interface subsystem 106 then reads data from the external memory 104. The data read by the memory interface subsystem 106 can then be provided to the recurrent neural network 102 as a portion of a later neural network input, e.g., along with a later system input.

The external memory 104 stores data vectors written to the external memory 104 by the memory interface subsystem 106. In some implementations, the external memory 104 is a real-valued matrix memory that has elements V(i,j), where i indexes the row in the memory and j indexes the vector element. Thus, V(i,j,) would be the value stored at element j of the vector stored at row i in the external memory 104.

To reflect the current state of the external memory 104, the memory interface subsystem 106 maintains a size vectors that has a corresponding entry for each row in the memory 104. The entries in the size vector define how the rows in the memory 104 should be weighted when the memory interface subsystem 106 reads from the memory 104.

To update the current state of the external memory, the system writes data to one or more new rows of the external memory 104, updates the existing entries of the size vector s, and adds a respective new entry to the size vector s corresponding to each of the new rows added to the external memory 104 using the current output o' generated by the recurrent neural network 102.

The memory interface subsystem 106 may interact with the external memory 104 and update the size vector by treating the external memory 104 as either a continuous stack memory, a continuous queue memory, or a continuous double-ended queue memory.

Interacting with the external memory and updating the size vector when the memory is a continuous stack memory is described in more detail below with reference to FIG. 3.

Interacting with the external memory and updating the size vector when the memory is a continuous queue memory is described in more detail below with reference to FIG. 4.

Interacting with the external memory and updating the size vector when the memory is a continuous double-ended queue memory is described in more detail below with reference to FIG. 5.

Figure 2:
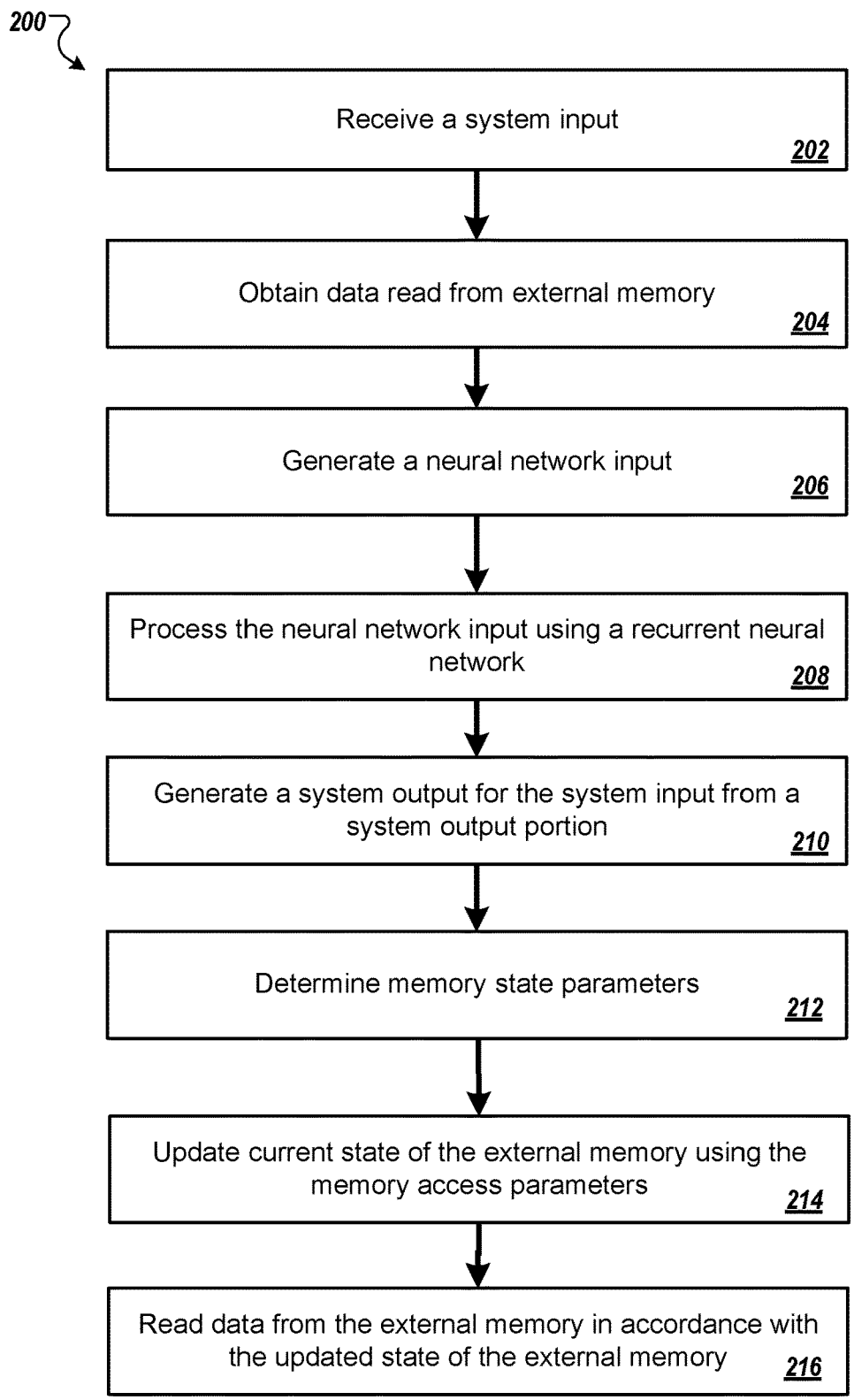
FIG. 2 is a flow diagram of an example process for generating a system output from a system input.

FIG. 2 is a flow diagram of an example process 200 for generating a system output from a system input. For convenience, the process 200 will be described as being performed by a system of one or more computers located in one or more locations. For example, an augmented neural network system, e.g., the augmented neural network system 100 of FIG. 1, appropriately programmed in accordance with this specification, can perform the process 200.

The system receives a system input (step 202). The system input is one of a sequence of system inputs received by the system.

The system obtains data read from an external memory, e.g., the external memory 104 of FIG. 1 (step 204). As will be described in more detail below, in some implementations, the data includes a single read vector while, in some other implementations, the data includes two read vectors: a top read vector and a bottom read vector. Generally, the data was generated by the system by reading from the external memory during processing of the preceding input in the sequence of system inputs.

The system generates a neural network input by combining the system input and the data read from the external memory (step 206). For example, the system can concatenate the system input and the single read data vector or the two read data vectors to generate the neural network input. For the first system input, the system can concatenate the first system input with a pre-determined vector, e.g., a vector learned during the training of the neural network.

The system processes the neural network input using a recurrent neural network, e.g., the recurrent neural network 102 of FIG. 1, to generate a neural network output from the neural network input (step 208). The recurrent neural network is configured to process the neural network input and the current internal state of the recurrent neural network to generate the neural network output and to update the current internal state of the recurrent neural network.

The system generates a system output from the neural network output (step 210). Generally, the system generates the system output from the neural network output by processing the neural network output in accordance with a set of output parameters. For example, the system output o may satisfy:

$$o = \tan h(W_o o' + b_o),$$

where $W_o$ is an output weight matrix, o' is the neural network output, and $b_o$ is an output bias vector.

The system determines memory state parameters from the neural network output (step 212), updates a current state of the external memory using the memory state parameters (step 214), and reads data from the external memory in accordance with the updated state of the external memory (step 216).

Generally, updating the current state of the external memory includes updating a current size vector and writing one or more write vectors to the external memory and reading data from the external memory includes reading one or more read vectors from the external memory in accordance with the updated state of the external memory.

As described above, the system maintains the external memory as either a continuous stack memory, a continuous queue memory, or a continuous double-ended queue memory. The memory state parameters that the system determines from the neural network output, the manner in which the system updates the current state of the external memory using those parameters, and the manner in which the system reads from the external memory depend on whether the external memory is a continuous stack memory, a continuous queue memory, or a continuous double-ended queue memory.

Determining memory state parameters, updating the current state of the external memory, and reading from the external memory when the memory is a continuous stack memory is described in more detail below with reference to FIG. 3.

Determining memory state parameters, updating the current state of the external memory, and reading from the external memory when the memory is a continuous queue memory is described in more detail below with reference to FIG. 4.

Determining memory state parameters, updating the current state of the external memory, and reading from the external memory when the memory is a continuous double-ended queue memory is described in more detail below with reference to FIG. 5.

The process 200 can be performed for each system input in a sequence of system inputs to generate a sequence of system outputs for the sequence of system inputs. The sequence of system inputs can be a sequence for which the desired output, i.e., the output sequence that should be generated by the system for the input sequence, is not known. The system can also perform the process 200 on inputs in a set of training data, i.e., a set of inputs for which the output that should be predicted by the system is known, in order to train the system, i.e., to determine trained values for the parameters of the neural network and any additional parameters of processes used in writing to and reading from the external memory. Because the components of the system are entirely differentiable, the process 200 can be performed repeatedly on inputs selected from a set of training data as part of a conventional machine learning training technique to train the neural network, e.g., a stochastic gradient descent backpropagation through time training technique.

Figure 3:
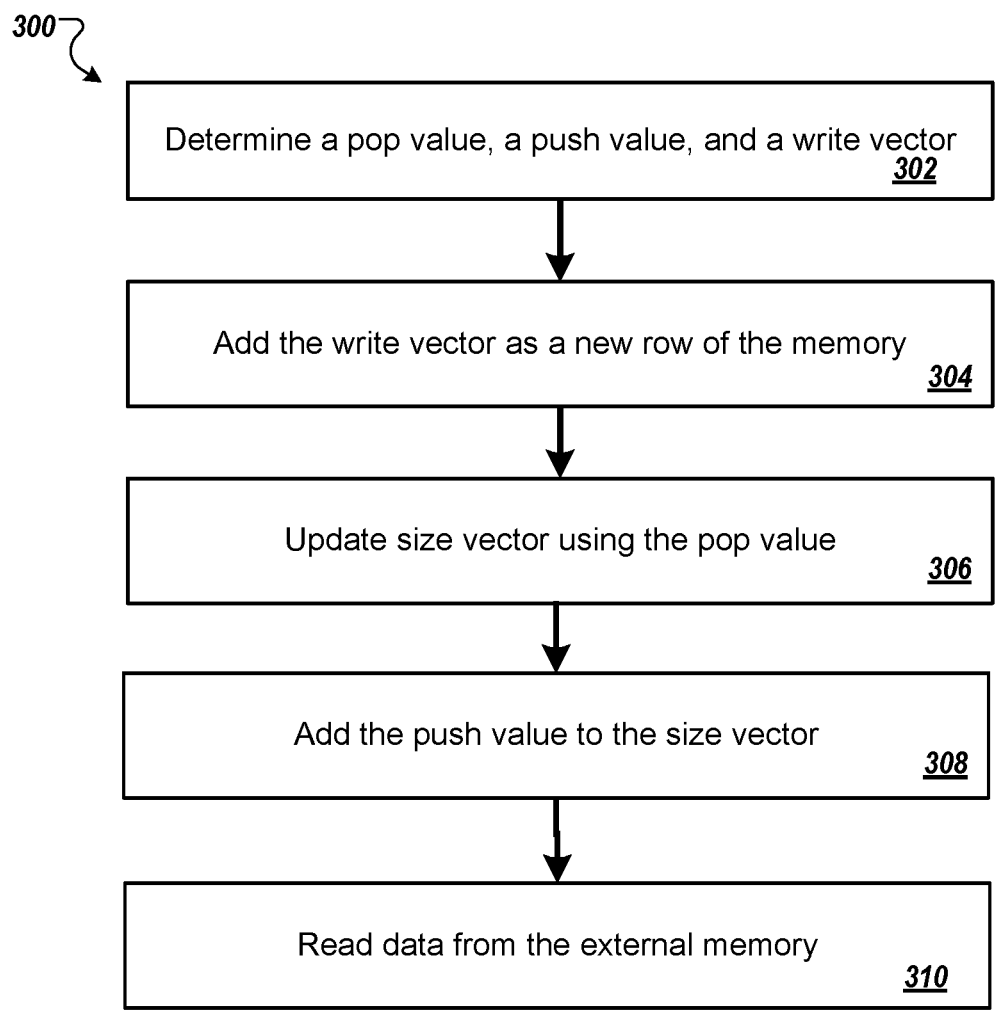
FIG. 3 is a flow diagram of an example process for updating the current state of the external memory and reading from the external memory when the external memory is a continuous stack memory.

FIG. 3 is a flow diagram of an example process 300 for updating the current state of the external memory and reading from the external memory when the external memory is a continuous stack memory. For convenience, the process 300 will be described as being performed by a system of one or more computers located in one or more locations. For example, an augmented neural network system, e.g., the augmented neural network system 100 of FIG. 1, appropriately programmed in accordance with this specification, can perform the process 300.

The system determines a pop value, a push value, and a write vector from the neural network output (step 302). Generally, the system determines the pop value by processing the neural network output in accordance with a set of pop parameters, determines the push value by processing the neural network output in accordance with a set of push parameters, and determines the write vector by processing the neural network output in accordance with a set of write parameters. For example, the pop value u, the push value d, and the write vector v may satisfy:

$u = \text{sigmoid}(W_u o' + b_u),$ $d = \text{sigmoid}(W_d o' + b_d),$ and $v = \tan h(W_v o' + b_v),$ where $W_u$ and $W_d$ are a pop weight matrix and a push weight matrix respectively that map the neural network output to a scalar value, $b_u$ and $b_d$ are a pop bias scalar and a push bias scalar respective, $W_v$ is a write weight matrix that maps the neural network output to a vector, and $b_v$ is a write bias vector.

The system adds the write vector as a new row of the external memory (step 304). That is, if the external memory currently has i−1 rows, the system adds the write vector as the i-th row of the external memory.

The system updates the size vector using the pop value (step 306).

Generally, the system performs a pop operation on the external memory that deletes a quantity of data defined by the pop value from the entries in the size vector.

To do so, the system traverses the size vector from the highest entry in the size vector to the lowest. During the traversal, if the value of the next entry is less than the remaining deletion quantity, the system subtracts the value from the remaining quantity and sets the value of the entry to zero. If the remaining deletion quantity is less than the value of the next entry, the system subtracts the remaining deletion quantity from that value and stops the traversal.

In particular, in some implementations, the updated value $S_t[i]$ for the i-th entry in the size vector after the update satisfies:

$$S_t[i] = \max\left(0, S_{t-i}[i] - \max\left(0, u - \sum_{j=i+1}^{t-1} S_{t-1}[j]\right)\right),$$

where $S_{t-i}[i]$ is the value of the i-th entry before the update and t−1 is the total number of entries in the size vector.

The system adds the push value to the size vector as a new entry corresponding to the new row of the matrix (step 308). That is, if the write vector has been added as the i-th row of the matrix, the system adds the push value as the i-th entry of the size vector.

The system reads from the external memory using the updated size vector (step 310).

Generally, the system reads a read vector that is a weighted sum of the rows of the matrix.

In some implementations, the weight for each row is the value of the corresponding entry of the size vector.

In some other implementations, the system traverses the size vector from the highest entry in the size vector to the lowest to determine a scaled value for each entry that the system uses as the weight for the row corresponding to the entry.

For example, in some implementations the scaled value $S_t'[i]$ for the i-th entry in the size vector satisfies:

$$S_t'[i] = \min\left(S_t[i], \max\left(0, 1 - \sum_{j=i+1}^{t} S_t[j]\right)\right).$$

The scaled value $S_t'[i]$ is a temporary value, i.e., because the value $S_t[i]$ is the value used as the value in the size vector to start the processing of the next system input.

Figure 4:
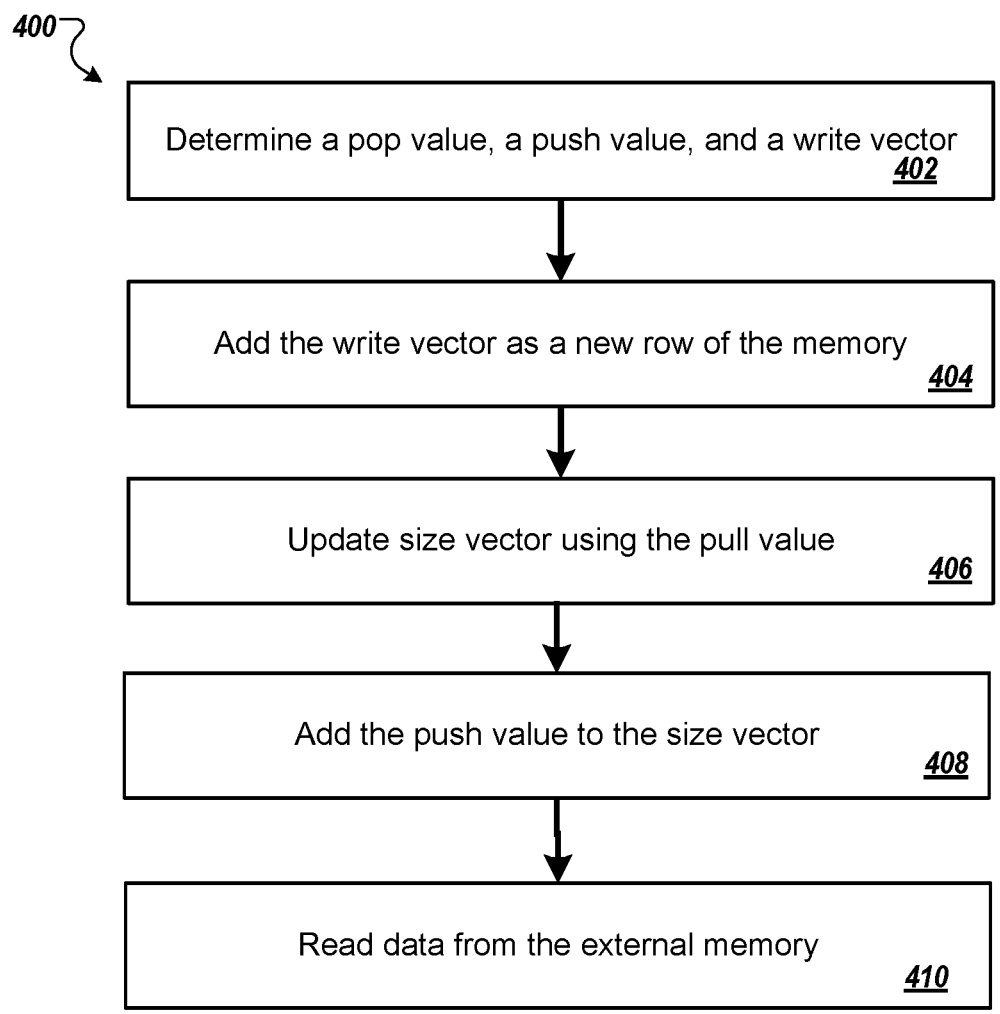
FIG. 4 is a flow diagram of an example process for updating the current state of the external memory and reading from the external memory when the external memory is a continuous queue memory.

FIG. 4 is a flow diagram of an example process 400 for updating the current state of the external memory and reading from the external memory when the external memory is a continuous queue memory. For convenience, the process 400 will be described as being performed by a system of one or more computers located in one or more locations. For example, an augmented neural network system, e.g., the augmented neural network system 100 of FIG. 1, appropriately programmed in accordance with this specification, can perform the process 400.

The system determines a pop value, a push value, and a write vector from the neural network output (step 402), e.g., as described above with reference to step 302 of FIG. 3, and adds the write vector as a new row of the external memory (step 404), e.g., as described above with reference to step 304 of FIG. 3.

The system updates the size vector using the pop value (step 406).

Generally, the system performs a pop operation on the external memory that deletes a quantity of data defined by the pop value from the entries in the size vector.

To do so, the system traverses the size vector from the lowest entry in the size vector to the highest. During the traversal, if the value of the next entry is less than the remaining deletion quantity, the system subtracts the value from the remaining quantity and sets the value of the entry to zero. If the remaining deletion quantity is less than the value of the next entry, the system subtracts the remaining deletion quantity from that value and stops the traversal.

In particular, in some implementations the updated value $S_t[i]$ for the i-th entry in the size vector after the update satisfies:

$$S_t[i] = \max\left(0, S_{t-i}[i] - \max\left(0, u - \sum_{j=1}^{i-1} S_{t-1}[j]\right)\right).$$

The system adds the push value to the size vector as a new entry corresponding to the new row of the matrix (step 408), e.g., as described above with reference to step 308 of FIG. 3.

The system reads from the external memory using the updated size vector (step 410).

Generally, the system reads a read vector that is a weighted sum of the rows of the matrix.

In some implementations, the weight for each row is the value of the corresponding entry of the size vector.

In some other implementations, the system traverses the size vector from the lowest entry in the size vector to the highest to determine a scaled value for each entry that the system uses as the weight for the row corresponding to the entry.

For example, in some implementations the scaled value $S_t'[i]$ for the i-th entry in the size vector satisfies:

$$S_t'[i] = \min\left(S_t[i], \max\left(0, 1 - \sum_{j=1}^{i-4} S_t[j]\right)\right).$$

The scaled value $S_t'[i]$ is a temporary value, i.e., because the value $S_t[i]$ is the value used as the value in the size vector to start the processing of the next system input.

Figure 5:
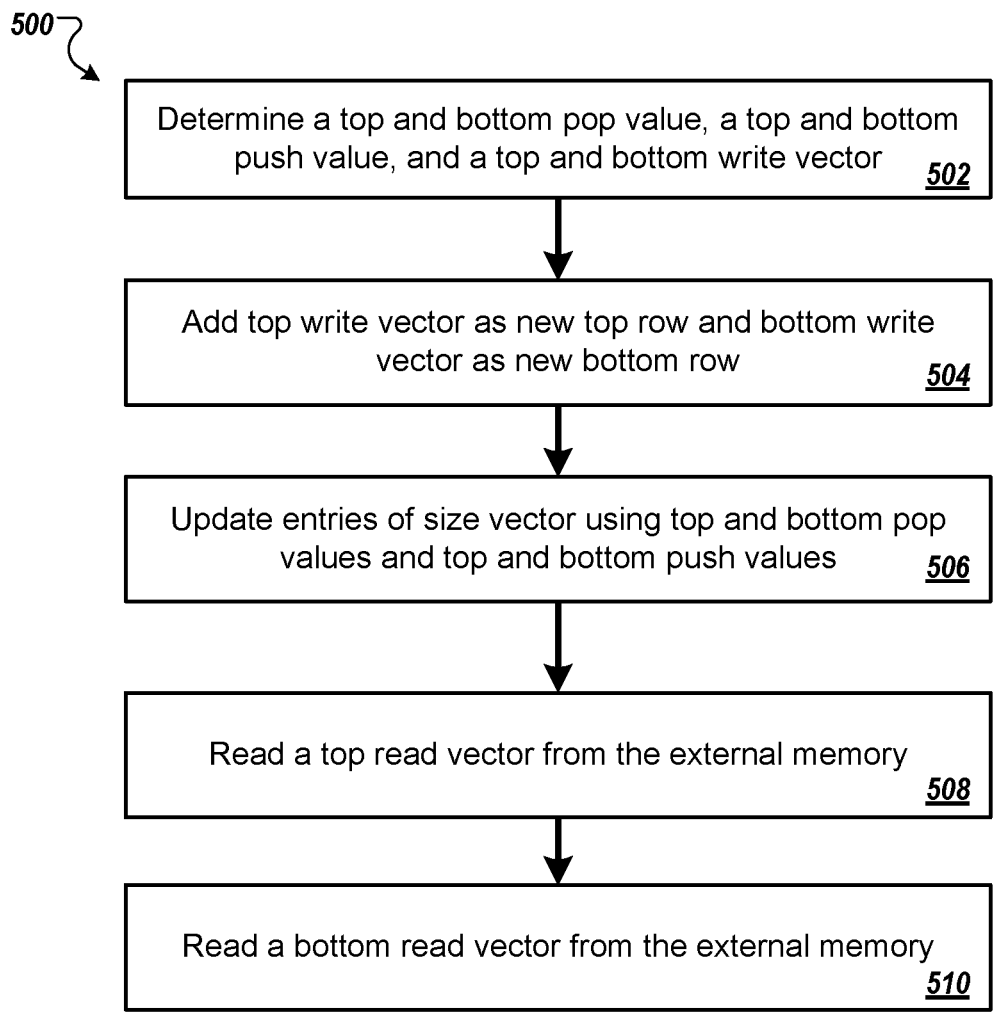
FIG. 5 is a flow diagram of an example process for updating the current state of the external memory and reading from the external memory when the external memory is a continuous double-ended queue memory.

FIG. 5 is a flow diagram of an example process 500 for updating the current state of the external memory and reading from the external memory when the external memory is a continuous double-ended queue memory. For convenience, the process 500 will be described as being performed by a system of one or more computers located in one or more locations. For example, an augmented neural network system, e.g., the augmented neural network system 100 of FIG. 1, appropriately programmed in accordance with this specification, can perform the process 500.

The system determines a top pop value, a bottom pop value, a top push value, a bottom push value, a top write vector and a bottom write vector from the neural network output (step 502). Generally, the system determines each of these quantities by processing the neural network output in accordance with a set of parameters that are specific to the quantity. For example, the top pop value $u^{top}$, the bottom pop value $u^{bot}$, the top push value $d^{top}$, the bottom push value $d^{bot}$, the top write vector $v^{top}$, and the bottom write vector $v^{bot}$ may satisfy:

$u^{top} = \text{sigmoid}(W_{utop}o' + b_{utop})$, $u^{bot} = \text{sigmoid}(W_{ubot}o' + b_{ubot})$, $d^{top} = \text{sigmoid}(W_{dtop}o' + b_{dtop})$, $d^{bot} = \text{sigmoid}(W_{dbot}o' + b_{dbot})$, $v^{top} = \tan h(W_{vtop}o' + b_{vtop})$, and $v^{bot} = \tan h(W_{vbot}o' + b_{vbot})$, where $W_{utop}$, $W_{ubot}$, $W_{dtop}$, and $W_{dbot}$ are a top pop weight matrix, a bottom pop weight matrix, a top push weight matrix, and a bottom push weight matrix respectively that map the neural network output to a scalar value, $b_{utop}$, $b_{ubot}$, $b_{dtop}$, and $b_{dbot}$ are respective bias scalars, $W_{vtop}$ and $W_{vbot}$ are a top write weight matrix and a bottom write weight matrix respectively that map the neural network output to a vector, and $b_{vtop}$ and $b_{vbot}$ are write bias vectors.

The system adds the top write vector as a new top row of the external memory and the bottom write vector as the new bottom row of the external memory (step 504). That is, when the current system input is the i-th system input to be processed, the system adds the bottom write vector as the new bottom row, i.e., the first row, of the external memory and adds the top write vector as the new top row, i.e., the 2i-th row, of the external memory.

The system updates the entries of the size vector using the top and bottom pop values and the top and bottom push values (step 506).

In particular, the system first generates an initial updated size vector using the top pop value and then generates a final updated size vector from the initial updated size vector using the bottom pop value.

To generate the initial updated size vector, the system traverses the size vector from the highest entry to the lowest to perform a pop operation on the external memory that deletes a quantity of data defined by the top pop value from the entries in the size vector.

During the traversal, if the value of the next entry is less than the remaining deletion quantity, the system subtracts the value from the remaining quantity and sets the value of the entry to zero. If the remaining deletion quantity is less than the value of the next entry, the system subtracts the remaining deletion quantity from that value and stops the traversal.

In particular, in some implementations the initial updated value $S_t^{top}[i]$ for the i-th entry in the size vector after the initial update satisfies:

$$S_t^{top}[i] = \max\left(0, S_{t-1}[i] - \max\left(0, u^{top} - \sum_{j=i+1}^{2(i-1)-1} S_{t-1}[j]\right)\right),$$

To generate the final updated size vector from the initial updated size vector, the system traverses the size vector from the lowest entry to the highest to perform a pop operation on the external memory that deletes a quantity of data defined by the bottom pop value from the initial updated values of the entries in the size vector.

During the traversal, if the initial updated value of the next entry is less than the remaining deletion quantity, the system subtracts the initial updated value from the remaining quantity and sets the final value of the entry to zero. If the remaining deletion quantity is less than the initial updated value of the next entry, the system subtracts the remaining deletion quantity from that value and stops the traversal.

In particular, in some implementations the final updated value $S_t[i]$ for the i-th entry in the size vector after the update satisfies:

$$S^t[i] = \max\left(0, S_t^{top}[i] - \max\left(0, u^{bot} - \sum_{j=i}^{i-1} S_t^{top}[j]\right)\right).$$

The system also adds the bottom push value as the new lowest entry in the size vector, i.e., as the entry corresponding to the bottom read vector in the external memory, and the top push value as the new highest entry in the size vector, i.e., as the entry corresponding to the top read vector in the external memory.

The system reads a top read vector from the external memory (step 508).

To read the top read vector, the system traverses the size vector from the highest entry in the size vector to the lowest to determine a temporary scaled value for each entry and then reads a read vector that is a weighted sum of the rows of the matrix, with the weight for each row being the scaled value of the corresponding entry of the size vector.

For example, in some implementations the temporary scaled value $S_t'[i]$ for the i-th entry in the size vector for reading the top read vector satisfies:

$$S_t'[i] = \min\left(S_t[i], \max\left(0, 1 - \sum_{j=i+1}^{2t} S_t[j]\right)\right).$$

The system reads a bottom read vector from the external memory (step 510).

To read the bottom read vector, the system traverses the size vector from the lowest entry in the size vector to the highest to determine a temporary scaled value for each entry and then reads a read vector that is a weighted sum of the rows of the matrix, with the weight for each row being the scaled value of the corresponding entry of the size vector.

For example, in some implementations the temporary scaled value $S_t'[i]$ for the i-th entry in the size vector when reading the bottom read vector satisfies:

$$S_t'[i] = \min\left(S_t[i], \max\left(0, 1 - \sum_{j=1}^{i-1} S_t[j]\right)\right).$$

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An augmented neural network system for processing one or more inputs to generate a sequence of system outputs, the augmented neural network system comprising:
   a recurrent neural network, wherein the recurrent neural network is configured to receive a network input at each of a plurality of time steps and to process the network input and a current internal state of the recurrent neural network to generate a neural network output for the time step and to update the current internal state of the recurrent neural network; and
   a memory interface subsystem, wherein the memory interface subsystem is configured to perform operations comprising, for each of the plurality of time steps:
      providing an output derived from the neural network output for the time step as a system output for the time step;
      determining, from the neural network output for the time step, memory state parameters for the time step;
      updating a current state of an external memory using the memory state parameters for the time step, wherein the external memory is configured to store data vectors written to the external memory by the memory interface subsystem, wherein the external memory assigns each data vector to a respective row in a matrix memory, wherein the external memory is further configured to store a size vector having a respective entry for each row in the matrix memory, and wherein updating the current state comprises:
 writing, based on the memory state parameters determined from the neural network output for the time step, data to one or more new rows of the matrix memory; and
 updating, based on the memory state parameters determined from the neural network output for the time step, the size vector, comprising:
  adding a respective new entry to the size vector for each new row of the matrix memory;
reading data from the external memory in accordance with the updated state of the external memory, wherein reading data from the external memory comprises:
 generating, from the entries in the updated size vector, a respective weight for each row of the matrix memory, and
 reading a read vector from the external memory by computing a weighted sum of the rows of the matrix memory in accordance with the respective weights; and
combining the data read from the external memory with a system input for the next time step to generate the neural network input for the next time step.

2. The augmented neural network system of claim 1, wherein determining, from the neural network output for the time step, memory state parameters comprises:
 determining, from the neural network output for the time step, a pop value for the time step;
 determining, from the neural network output for the time step, a push value for the time step; and
 determining, from the neural network output for the time step, a write vector for the time step.

3. The augmented neural network system of claim 2, wherein updating the current state of the external memory comprises:
 adding the write vector as a new row of the matrix.

4. The augmented neural network system of claim 3, wherein updating the size vector comprises:
 updating the entries of the size vector using the pop value to update the weights for the vectors in the rows of the matrix; and
 adding the push value to the size vector as an entry corresponding to the new row of the matrix.

5. The augmented neural network system of claim 4, wherein the respective weights are the corresponding entries of the size vector.

6. The augmented neural network system of claim 5, wherein combining the data read from the external memory with the system input for the next time step to generate the neural network input for the next time step comprises:
 concatenating the read vector and the system input to generate the neural network input for the next time step.

7. The augmented neural network system of claim 1, wherein determining, from the neural network output for the time step, memory state parameters comprises:
 determining, from the neural network output for the time step, a top pop value for the time step and a bottom pop value for the time step;
 determining, from the neural network output for the time step, a top push value for the time step and a bottom push value for the time step; and
 determining, from the neural network output for the time step, a top write vector for the time step and a bottom write vector for the time step.

8. The augmented neural network system of claim 7, wherein updating the current state of the external memory comprises:
 adding the top write vector as a new top row of the matrix; and
 adding the bottom write vector as a new bottom row of the matrix.

9. The augmented neural network system of claim 8, wherein updating the current state of the external memory comprises:
 updating each current entry of the size vector based on the current entry and the current entries after the current entry in the size vector using the top pop value to generate initial updated entries of the size vector;
 updating each initial updated entry of the size vector based on the initial updated entry and the initial updated entries before the initial updated entry in the size vector using the bottom pop value to generate final updated entries; and
 adding the top push value to the size vector as an entry corresponding to the new top row of the matrix and the bottom push value to the size vector as an entry corresponding to the new bottom row of the matrix.

10. The augmented neural network system of claim 9, wherein reading data from the external memory in accordance with the updated internal state comprises:
 reading a top read vector from the external memory, wherein each entry of the top read vector is a weighted sum of the rows of the matrix, and wherein each row is weighted according to the corresponding entry in the size vector and the entries after the corresponding entry in the size vector; and
 reading a bottom read vector from the external memory, wherein each entry of the top read vector is a weighted sum of the rows of the matrix, and wherein each row is weighted according to the corresponding entry in the size vector and the entries before the corresponding entry in the size vector.

11. The augmented neural network system of claim 10, wherein combining the data read from the external memory with the system input for the next time step to generate the neural network input for the next time step comprises:
 concatenating the top read vector, the bottom read vector, and the system input to generate the neural network input for the next time step.

12. A method for processing one or more inputs to generate a sequence of system outputs using an augmented neural network system comprising a recurrent neural network,
 wherein the recurrent neural network is configured to receive a network input at each of a plurality of time steps and to process the network input and a current internal state of the recurrent neural network to generate a neural network output for the time step and to update the current internal state of the recurrent neural network, and
 wherein the method comprises, for each of the plurality of time steps:
  providing an output derived from the neural network output for the time step as a system output for the time step;

determining, from the neural network output for the time step, memory state parameters for the time step;

updating a current state of an external memory using the memory state parameters for the time step, wherein the external memory is configured to store data vectors written to the external memory, wherein the external memory assigns each data vector to a respective row in a matrix memory, wherein the external memory is further configured to store a size vector having a respective entry for each row in the matrix memory, and wherein updating the current state comprises:

writing, based on the memory state parameters determined from the neural network output for the time step, data to one or more new rows of the matrix memory; and updating, based on the memory state parameters determined from the neural network output for the time step, the size vector, comprising:

adding a respective new entry to the size vector for each new row of the matrix memory;

reading data from the external memory in accordance with the updated state of the external memory, wherein reading data from the external memory comprises:

generating, from the entries in the updated size vector, a respective weight for each row of the matrix memory, and reading a read vector from the external memory by computing a weighted sum of the rows of the matrix memory in accordance with the respective weights; and combining the data read from the external memory with a system input for the next time step to generate the neural network input for the next time step.

13. The method of claim 12, wherein determining, from the neural network output for the time step, memory state parameters comprises:

determining, from the neural network output for the time step, a pop value for the time step;

determining, from the neural network output for the time step, a push value for the time step; and determining, from the neural network output for the time step, a write vector for the time step.

14. The method of claim 13, wherein updating the current state of the external memory comprises:

adding the write vector as a new row of the matrix.

15. The method of claim 14, wherein updating the size vector comprises:

updating the entries of the size vector using the pop value to update the weights for the vectors in the rows of the matrix; and adding the push value to the size vector as an entry corresponding to the new row of the matrix.

16. The method of claim 15, wherein the respective weights are the corresponding entries of the size vector.

17. The method of claim 16, wherein combining the data read from the external memory with the system input for the next time step to generate the neural network input for the next time step comprises:

concatenating the read vector and the system input to generate the neural network input for the next time step.

18. The method of claim 12, wherein determining, from the neural network output for the time step, memory state parameters comprises:

determining, from the neural network output for the time step, a top pop value for the time step and a bottom pop value for the time step;

determining, from the neural network output for the time step, a top push value for the time step and a bottom push value for the time step; and determining, from the neural network output for the time step, a top write vector for the time step and a bottom write vector for the time step.

19. The method of claim 18, wherein updating the current state of the external memory comprises:

adding the top write vector as a new top row of the matrix; and adding the bottom write vector as a new bottom row of the matrix.

20. The method of claim 19, wherein updating the current state of the external memory comprises:

updating each current entry of the size vector based on the current entry and the current entries after the current entry in the size vector using the top pop value to generate initial updated entries of the size vector;

updating each initial updated entry of the size vector based on the initial updated entry and the initial updated entries before the initial updated entry in the size vector using the bottom pop value to generate final updated entries; and adding the top push value to the size vector as an entry corresponding to the new top row of the matrix and the bottom push value to the size vector as an entry corresponding to the new bottom row of the matrix.

21. The method of claim 20, wherein reading data from the external memory in accordance with the updated internal state comprises:

reading a top read vector from the external memory, wherein each entry of the top read vector is a weighted sum of the rows of the matrix, and wherein each row is weighted according to the corresponding entry in the size vector and the entries after the corresponding entry in the size vector; and reading a bottom read vector from the external memory, wherein each entry of the top read vector is a weighted sum of the rows of the matrix, and wherein each row is weighted according to the corresponding entry in the size vector and the entries before the corresponding entry in the size vector.

22. The method of claim 21, wherein combining the data read from the external memory with the system input for the next time step to generate the neural network input for the next time step comprises:

concatenating the top read vector, the bottom read vector, and the system input to generate the neural network input for the next time step.

23. One or more non-transitory computer-readable storage media encoded with instructions that, when executed by one or more computers, cause the one or more computers to implement an augmented neural network system for processing one or more inputs to generate a sequence of system outputs, the augmented neural network system comprising:

a recurrent neural network, wherein the recurrent neural network is configured to receive a network input at each of a plurality of time steps and to process the network input and a current internal state of the recurrent neural network to generate a neural network output for the time step and to update the current internal state of the recurrent neural network; and a memory interface subsystem, wherein the memory interface subsystem is configured to perform operations comprising, for each of the plurality of time steps:
providing an output derived from the neural network output for the time step as a system output for the time step;
determining, from the neural network output for the time step, memory state parameters for the time step;
updating a current state of an external memory using the memory state parameters for the time step, wherein the external memory is configured to store data vectors written to the external memory by a memory interface subsystem, wherein the external memory assigns each data vector to a respective row in a matrix memory, wherein the external memory is further configured to store a size vector having a respective entry for each row in the matrix memory, and wherein updating the current state comprises:
writing, based on the memory state parameters determined from the neural network output for the time step, data to one or more new rows of the matrix memory; and
updating, based on the memory state parameters determined from the neural network output for the time step, the size vector, comprising:
adding a respective new entry to the size vector for each new row of the matrix memory;
reading data from the external memory in accordance with the updated state of the external memory, wherein reading data from the external memory comprises:
generating, from the entries in the updated size vector, a respective weight for each row of the matrix memory, and
reading a read vector from the external memory by computing a weighted sum of the rows of the matrix memory in accordance with the respective weights; and
combining the data read from the external memory with a system input for the next time step to generate the neural network input for the next time step.

* * * * *